United States Patent [19]

Seitz et al.

[11] Patent Number: 4,577,668

[45] Date of Patent: Mar. 25, 1986

[54] VEHICLE WHEEL

[75] Inventors: Hans Seitz; Henner Pieper; Udo Frerichs, all of Langenhagen; Heinz-Dieter Rach, Garbsen, all of Fed. Rep. of Germany

[73] Assignee: Continental Gummi-Werke Aktiengesellschaft, Hanover, Fed. Rep. of Germany

[21] Appl. No.: 523,695

[22] Filed: Aug. 16, 1983

[30] Foreign Application Priority Data

Aug. 20, 1982 [DE] Fed. Rep. of Germany ....... 3231012

[51] Int. Cl.$^4$ .................. B60C 17/00; B60C 15/02
[52] U.S. Cl. .................. 152/520; 152/387; 152/399; 152/380; 152/379.3
[58] Field of Search .......... 152/330 RF, 379.4, 379.5, 152/379.3, 380, 387, 388, 397, 399, 3

[56] References Cited

U.S. PATENT DOCUMENTS 4,169,496 10/1979 Cataldo ........................... 152/399 X
4,408,647 10/1983 Kuhn et al. .................. 152/330 RF Primary Examiner—Robert B. Reeves
Assistant Examiner—M. J. Abate
Attorney, Agent, or Firm—Becker & Becker, Inc.

[57] ABSTRACT

A vehicle wheel having a one-piece rim and being provided for a pneumatic belted tire. The seats for the tire beads are located on the radially inner surface of the rim. In order to assure trouble-free emergency operation of the tire in the event of damage or a defect, on the rim and/or on the tire, structures are provided which, at least in the region of the support surface of the tire, effect a disengagement of the tire beads from the rim seats during a loss of air pressure, and which prevent an only periodic return of the tire beads to the seats while driving.

12 Claims, 6 Drawing Figures

VEHICLE WHEEL

BACKGROUND OF THE INVENTION

The present invention relates to a vehicle wheel for a pneumatic tire. The vehicle wheel has a rigid one-piece rim, and the tire is a belted tire having pull-resistant cores in the beads. The rim of the wheel has rim flanges which essentially extend radially inwardly. Seats for the tire beads are provided on the inner surface of the rim next to the rim flanges. Also on the inner surface of the rim, toward the central plane of the rim body, are arranged recessed portions the base of which has a diameter which is greater than the average diameter of the seats. Circumferential supporting surfaces for the tire are present on the outer surface of the rim.

In the event of a defect or failure, i.e. when the air escapes or leaks out of the tire, one is faced with the common problem that no matter how carefully one continues to drive, damage or even destruction of the tire is caused. This is primarily due to the fact that when riding on a flat tire, the difference between the rolling or riding periphery of the rim and the periphery of the tire produces unusually great friction which can result in thermal destruction of the tire. Due to the difference between these two peripheries, the tire beads periodically become detached from the seats, but are then pushed back during the course of further rotation of the wheel; the tire begins to "flap".

With known vehicle wheels, an aid to the resolution of the described problems is the introduction into the hollow cavity of the tire of a coolant or lubricant. However, this measure in very involved, and in practice has also not produced the desired results.

It is therefore an object of the present invention to provide a vehicle wheel of the aforementioned general type which has improved characteristics with regard to emergency operation.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
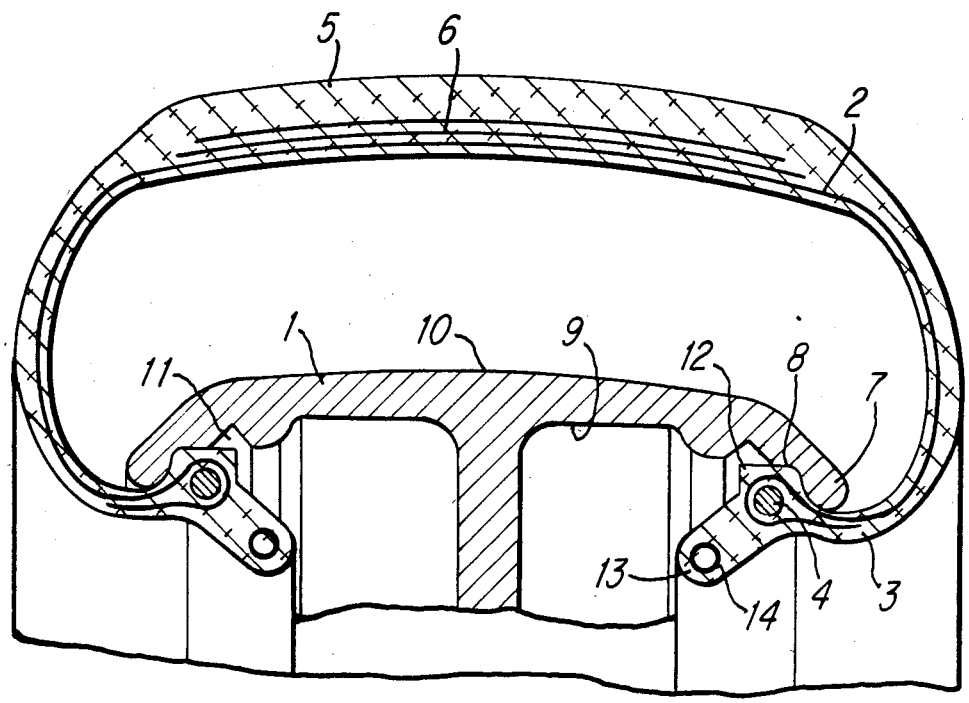
FIG. 1 is a radial partial section through one inventive embodiment of a vehicle wheel during normal operation.

The inventive vehicle wheel for a pneumatic tire is characterized primarily in that means are provided on the rim and/or on the tire beads which, at least in the region of the support surface of the tire, effect a disengagement of the tire beads from the rim seats when an air pressure loss or leakage is encountered as a result of damage or a defect, and which prevents an only periodic return of the tire beads to the seats while driving, so that the rim rides on the inside of the tire during emergency operation.

The present invention is based upon the realization that large frictional loads can be prevented if reliable measures are provided which immediately allow the beads to jump inwardly from the rim seats during an emergency and to thereafter be held in this position. The rim then, so to speak, rides on the tire, so that the different perimeters do not have to be balanced out by slipping. Stated in other words, during rotation of the rim, the tire covers less than a complete revolution without encountering inner deformations. A reliable disengagement of the tire beads from the rim seats during an emergency is achieved in that each tire bead can, by means of a molded-on nose, which contains an additional spring element, experience torque in the mounted state which generates on the nose a force which is directed toward the recessed portion of the rim. During pressure loss, the beads of the tire move in the direction of these recessed portions, and their return to their original position is prevented by means of molded-on projections which, so to speak, catch behind rim shoulders.

The aforementioned torque can be produced by vulcanizing the tire in the spread apart state with axially outwardly directed noses, and possibly also vulcanizing-in as the additional spring element a circumferential coil spring which is disposed in the nose at a distance from the bead core.

When the tire is being mounted, the spread-apart beads thereof are turned-in into the rim, with the nose being pivoted about the adjacent wire core. After the nose has overcome the vertical position, the coil spring produces the aforementioned torque with a force which is directed toward the recessed portion of the rim. At this point, the nose extends axially and radially inward from the adjacent bead core.

As the spring element, such nose may be provided with a woven strip of textile strands or steel wires, with the woven strip, when viewed in cross section, extending approximately in a U. In the non-mounted state of the tire, i.e. in the vulcanizing position, the steel wires in the U-arms of the woven strip may form an angle of approximately 45° with the circumferential direction of the tire.

The advantage of a particularly good guidance of the tire on the rim in an emergency can be achieved by providing a circumferential raised guide element on the middle of the radially inner side of the tire, and by providing the rim with a corresponding groove in which the raised guide element can ride.

It is also possible to provide the inner side of the sidewalls of the tire with wider wall portions.

DESCRIPTION OF PREFERRED EMBODIMENTS

Referring now to the drawings in detail, the vehicle wheel shown in FIG. 1 comprises a one-piece rim 1 made of metal or a material having a similar strength; mounted on the rim 1 is a belted tire built up essentially of rubber or rubberlike materials. The tire has a radial carcass 2 which is anchored in the beads 3 by being looped around the pull-resistant bead cores 4. Below the tread 5, between the latter and the carcass 2, there is located a belt 6 which is pull-resistant in the circumferential direction, comprises two or more cord plies and effects side stabilization of the tire body.

The radially outer part of the rim 1 serves for mounting and holding the tire beads 3, and for supporting the tire in case of an emergency. Both outer sides of the rim are limited by a rim flange 7 which essentially extends radially inwardly. Next to each rim flange 7, on the inner surface of the rim 1, there is located a seat 8 for a tire bead 3; furthermore, axially inwardly of each seat 8 is located a recessed portion 9, the base of which has a greater diameter than the average diameter of the seat 8. The radially outer surface of the rim serves as a supporting surface 10 for the tire during emergency operation.

With the vehicle wheel according to FIG. 1, which shows the wheel during normal operation, the means which assure emergency operation include a respective groove 11 in the rim next to each seat 8, and, on the tire bead, a projection 12 which is located in the vicinity of the groove 11, and a nose 13 which when the tire is mounted generates torque. To increase the torque, the nose 13 may include a supplemental spring element, such as a circumferential coil spring 14 which extends in the rubber nose 13 at a uniform distance from the bead core 4. The nose 13 can also serve as an aid during mounting and removal of the tire.

Figure 2:
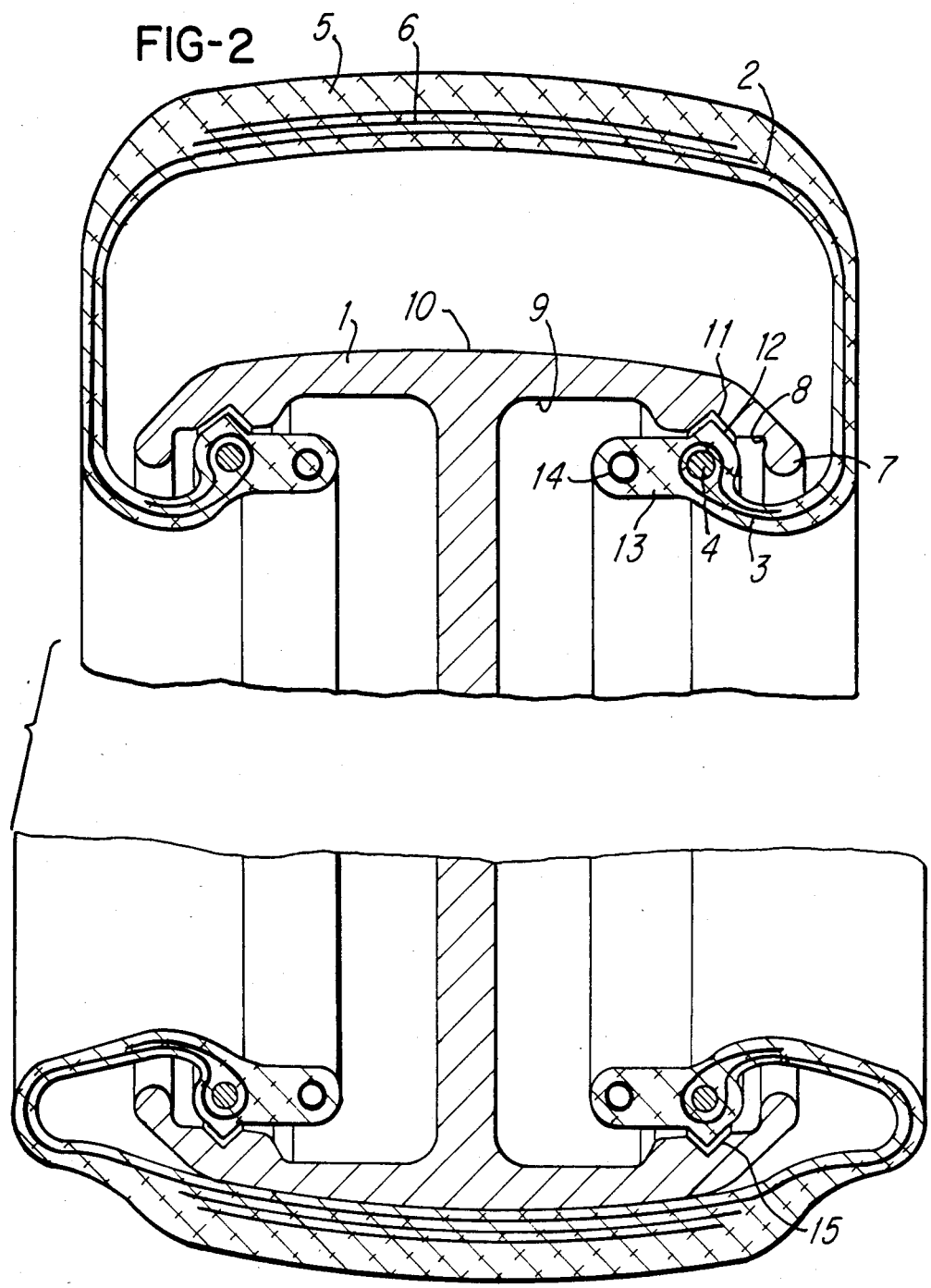
FIG. 2 is a section through the support surface and the opposite side of the vehicle wheel of FIG. 1 during emergency operation.

FIG. 2 shows the vehicle wheel of FIG. 1 during emergency operation. During a sudden drop in pressure, the tire, with the assistance of the torque of the nose 13, is pressed inwardly from the seats 8, and the projections 12 settle into the grooves 11, so that a return of the tire beads 3 to the seats 8 is prevented. A wall 15 of the grooves 11 serves as a rim folder behind which each projection 12 of the tire bead 3 catches. The tire is supported on the radially outer supporting surface 10 of the rim, while the sensitive side wall portions bulge. Due to the reliable disengagement of the tire beads 3 from the seats 8 of the rim, the rim 1 can freely ride on the inside of the tire. Thus, despite the different circumferential lengths of the rim and the tire, no inner deformations occur in the tire which could lead to destruction of the latter.

Figure 3:
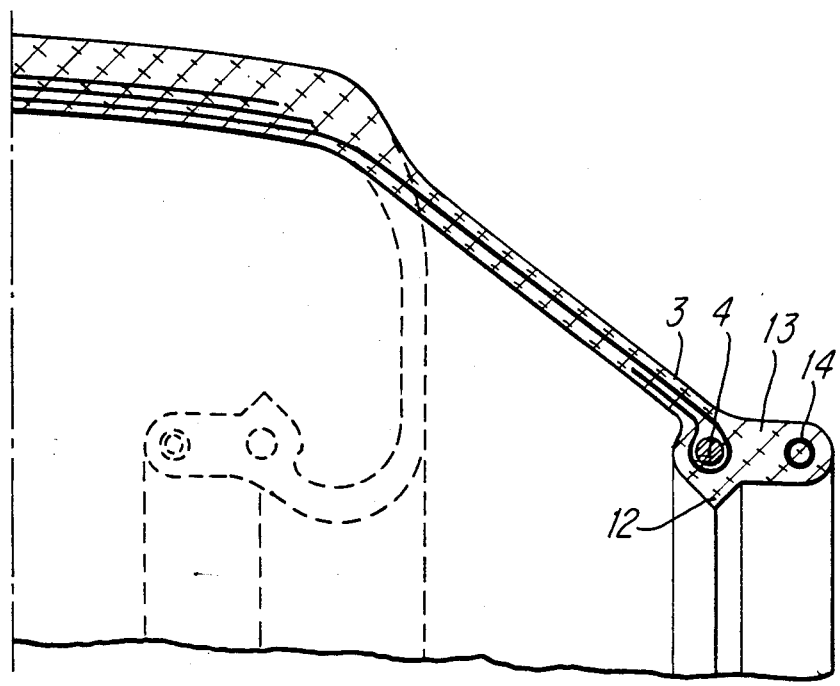
FIG. 3 is a radial partial section through a tire made pursuant to the present invention showing the vulcanizing position and the turned-in, mounted position.

The view of the tire pursuant to FIG. 3 serves to illustrate the production of a torque in the nose 13 of each tire bead 3. The tire, with the side walls and beads 3 spread out to the sides, is vulcanized in a position in which the noses 13, with the coil springs 14 contained therein, are essentially directed axially outwardly. To mount the tire, the latter is turned in into the dashed line position. In so doing, a force must first be applied until the position is achieved in which the coil spring 14 is located directly below the bead core 4. This force is thereafter released and produces at the nose 13 a torque which wants to turn the nose toward the rim. It can be advantageous to not fixedly embed the bead cores 4 in the surrounding material, so that it is easier to turn the noses. This can, for example, be achieved by means of a fabric core winding and/or a separating detachment.

Figure 4:
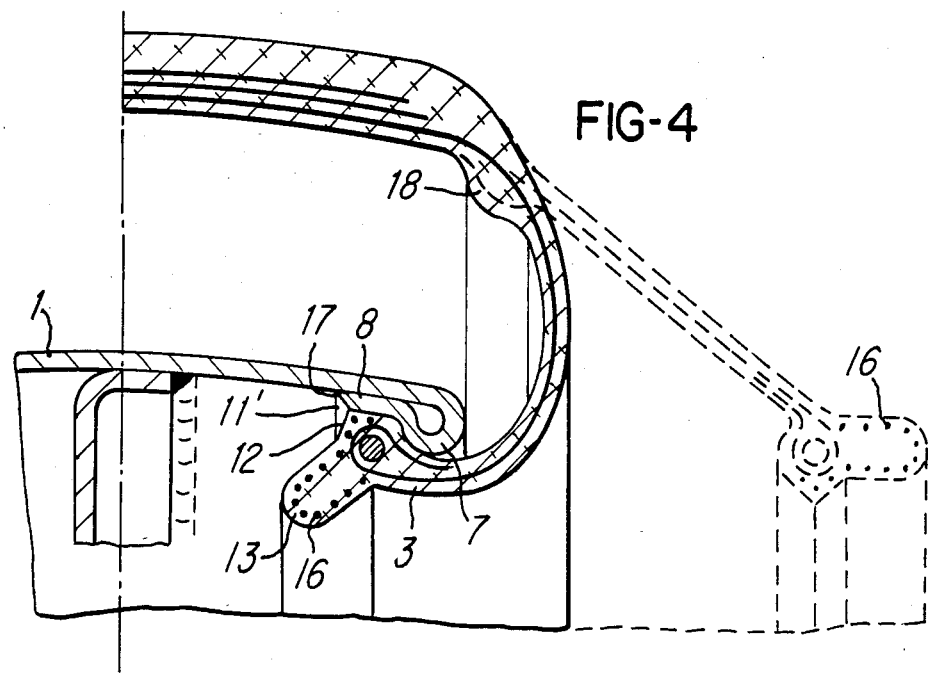
FIG. 4 is a radial partial section through another inventive embodiment of a vehicle wheel during normal operation having a woven strip as the spring element.

The vehicle wheel illustrated in FIG. 4 differs from that of FIG. 1 primarily by a different construction of the spring element in the nose 13, and by a different configuration of the rim.

A woven strip 16 of steel wires or cables serves as a spring element and extends in the nose 13 in such a way that it has a U-shaped cross section. In the non-mounted state of the tire, i.e. in the vulcanizing position, the steel wires in the U-arms of the woven strip 16 form an angle of approximately 45° with the circumferential direction of the tire. It would also be possible to use a woven strip of natural or synthetic textile strength carriers.

Figure 5:
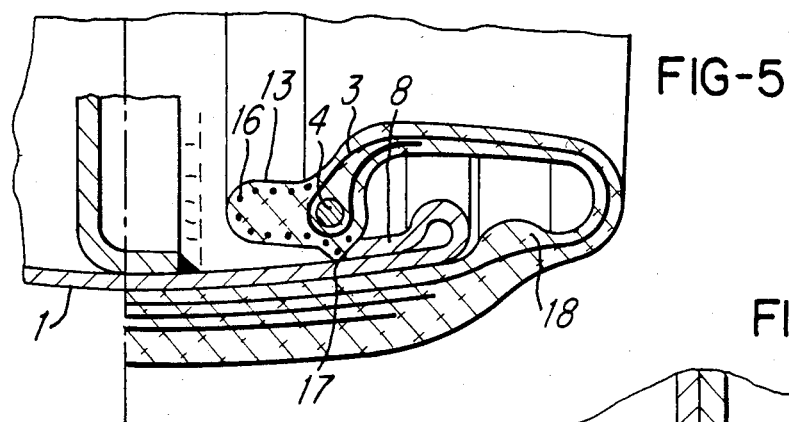
FIG. 5 shows the vehicle wheel of FIG. 4 during emergency operation.

The axially outer ends of the rim are beaded via a folded-over portion, with the beaded ends forming the rim flange 7, the seats 8 for the tire beads 3, and additional rim shoulders 17 behind which the projections 12 on the tire bead 3 can catch during an emergency, as shown in FIG. 5.

As shown in FIGS. 4 and 5, the inner side of the tire walls are provided with a wider wall portion 18 which offers an additional protection and can serve as an additional side guidance for the tire. Such a wider wall portion can also be provided for the wheel of FIG. 1.

Figure 6:
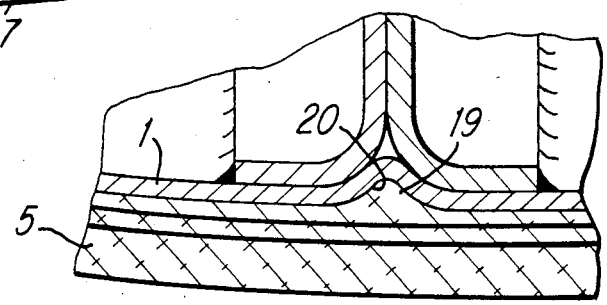
FIG. 6 shows in a detailed radial section an inventive vehicle wheel having a central guide for emergency operation.

FIG. 6 is a radial section showing a central guide for a vehicle wheel. During an emergency operation, this central guide provides for an even more uniform riding of a rim 1 on the inside of a tire. The center of the radially inner side of the tire is provided with a circumferential raised guide element 19 which during an emergency rides in a rim groove 20 located centrally on the radially outer side of the rim.

The present invention is, of course, in no way restricted to the specific disclosure of the specification and drawings, but also encompasses any modifications within the scope of the appended claims.

What we claim is:

1. A vehicle wheel in combination with a belted pneumatic tire having two beads and a pull-resistant core in each bead; comprising:

a rigid one-piece rim with two essentially radially inwardly extending rim flanges; adjacent each rim flange and on the radially inner surface of said rim, the latter is provided with a respective seat, one for each of said tire beads; said rim also being provided on said radially inner surface with two recessed portions respectively disposed between one of said seats and a central plane of said rim, with the base of each of said recessed portions being disposed on a diameter of said rim which is greater than the average diameter of said rim on which said seats are disposed; the radially outer surface of said rim being provided with a circumferential supporting surface for the radially inner surface of said tire; and means which are provided on at least one of said rim and said tire beads, and which, at least in the region of that part of said tire being supported on a driving surface at any given time, effect a disengagement of said tire beads from said seats when said tire experiences a loss of air pressure, and also prevent an only periodic return of said tire beads to said seats while said tire is being driven after having experienced said loss of air, with said supporting surface of said rim riding on said radially inner surface of said tire during such an emergency operation.

2. A wheel and tire combination according to claim 1, in which said means include respective shoulders on said radially inner surface of said rim adjacent to and axially inwardly of, a given seat thereof, and a projection on each of said tire beads; said projections, subsequent to the disengagement of said tire beads from said seats, catching behind, i.e. axially inwardly of, an associated shoulder.

3. A wheel and tire combination according to claim 2, in which each of said tire beads has formed thereon a nose which contains a spring element and which, when said tire is mounted on said wheel for normal operation, extends axially and radially inwardly from an associated bead core; each of said tire beads, by means of said noses, experiencing a torque which produces at said noses a force which is directed toward said recessed portions of said rim.

4. A wheel and tire combination according to claim 3, in which, in order to produce said torque, said tire is vulcanized in a spread state, in which said noses are essentially directed axially outwardly.

5. A wheel and tire combination according to claim 4, in which said noses are pivotable about their associated bead cores.

6. A wheel and tire combination according to claim 3, in which each nose contains as said spring element a circumferential coil spring which extends at a uniform distance relative to said bead core.

7. A wheel and tire combination according to claim 3, in which each nose contains as said spring element a woven strip which has an approximately U-shaped cross section.

8. A wheel and tire combination according to claim 7, in which said woven strip comprises textile filaments.

9. A wheel and tire combination according to claim 7, in which said woven strip comprises steel wires.

10. A wheel and tire combination according to claim 7, in which, in the non-mounted state of said tire, i.e. in a spread, vulcanizing state, the filaments in the U-arms of said woven strip form an angle of approximately 45° with the circumferential direction of said tire.

11. A wheel and tire combination according to claim 1, in which said rim is provided with a groove in the middle of said radially outer supporting surface; and in which the middle of the radially inner surface of said tire provided with a circumferential raised guide element which rides in said rim groove during emergency operation.

12. A wheel and tire combination according to claim 1, in which said tire is provided with sidewalls, the inner side of each of which is provided with a wider portion.

* * * * *